May 19, 1964 M. W. MARIEN 3,133,739
PISTON RING
Filed June 6, 1960 2 Sheets-Sheet 1
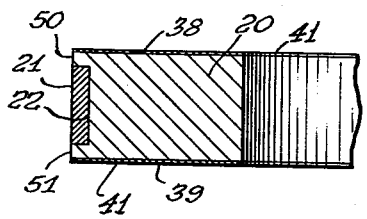
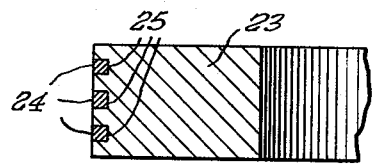
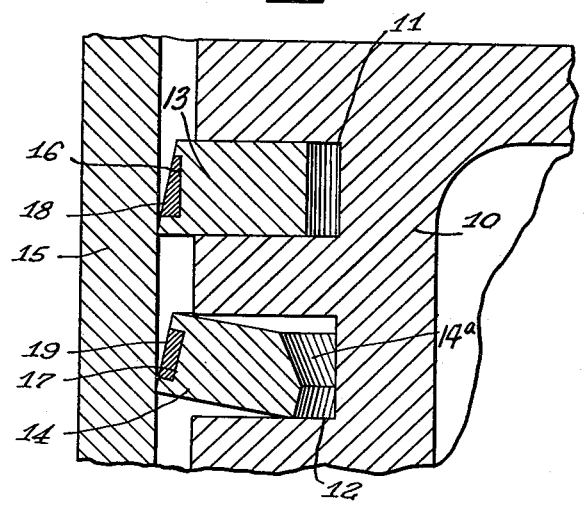
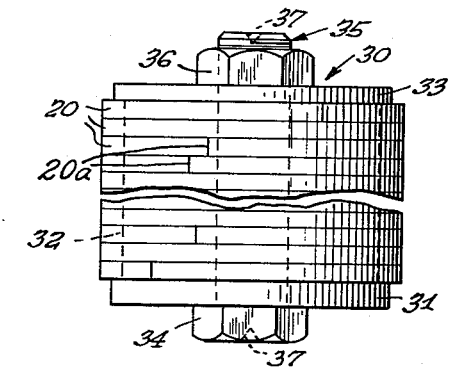
Inventor
Melvin W. Marien May 19, 1964 M. W. MARIEN 3,133,739
PISTON RING Filed June 6, 1960 2 Sheets-Sheet 2

Inventor
Melvin W. Marien

By Hill, Sherman, Meroni, Gross & Simpson Attys

3,133,739
PISTON RING
Melvin W. Marien, Brentwood, Mo., assignor to Ramsey Corporation, St. Louis, Mo., a corporation of Ohio
Filed June 6, 1960, Ser. No. 34,239
5 Claims. (Cl. 277—235)

The present invention is broadly directed to piston rings, and is more particularly directed to a new and improved piston ring structure which is provided with a circumferential molybdenum filled groove.

Piston rings, whether of the compression or oil type, are exposed to substantial wear in use due to contact with the cylinder wall, as well as with the side walls of the ring grooves of the piston. In order to reduce piston ring wear, chromium has been, in the past, coated on the ring bearing surfaces but the high cost of producing chromium plated piston rings has limited the use of such rings. Still further, chromium coatings have been found to be relatively dense and therefore have oil retention properties which are not entirely satisfactory.

In order to obviate the disadvantageous characteristics of chromium plated piston rings while still providing rings which are characterized by superior resistance to abrasive and erosive wear and good oil retention properties, means have been provided for coating the flat bearing surfaces thereof with a porous wear resistant metal or metallic compound. It has been found that porous, wear resistant metal or metal oxide coated piston rings have a substantially increased life since they are characterized by a marked increase in resistance to abrasive and/or erosive wear, and a relatively low coefficient of friction. It has further been found that a substantial improvement in ring life and in the engine break-in is obtained due to the porosity and thus the oil retention characteristics of such coated rings.

The term "metal" as used herein with reference to the porous wear resistant material for coating the bearing face of the piston rings of this invention will include metallic compounds such as metal oxides.

However, while a hard metal bearing surface is advantageous from the standpoint of resistance to abrasive and/or erosive wear, it does not mate with the cylinder walls as rapidly as the usual materials used in the manufacture of piston rings such, for instance, as cast iron. It has been felt therefore that the provision of a piston ring having the combined advantageous characteristics of hard and ferrous metals would be desirable. Thus, banding of various types of piston rings of ferrous composition (such as the various irons and steels which may or may not have been nitrided) with a porous wear resistant metal is within the purview of this invention.

I have devised a piston ring which does combine the advantageous characteristics of wear resistant and ferrous metals and which employs the different metals to best advantage. While many wear resistant metals might be used to band ferrous metal rings, I have found that molybdenum and aluminum trioxide are particularly adapted for such use since they also possess quite good oil retention characteristics when they have been spray deposited.

The piston ring which is the subject of the present invention has a circumferential groove formed therein which is filled with a wear resistant metal having good oil retention characteristics. Because molybdenum and aluminum trioxide can be spray deposited to form a porous oil retaining band, these materials are preferred though this invention should not be construed as being limited to these materials. The wear resisting metal is bonded to the ring and its outer surfaces lie in the surface of revolution common to the outer bearing surface of the ring so that it comprises a circumferential hard-metal band. By forming a piston ring in this manner, the upper and lower portions of the ring bearing surfaces may be formed of ferrous metal or some other suitable metal so that the cylinder-wall-mating properties of these softer metals may be employed to best advantage at the edges of the ring bearing faces.

An important feature of the invention lies in the manner in which piston rings of the foregoing type may be produced. Piston rings which are stacked congruently and then have their entire bearing surfaces coated with hard metals in the finished state, are not readily separable after the finishing operation. However, in accordance with my invention, the outer surfaces of the congruently stacked piston rings are grooved prior to deposition of the wear resisting metal coating and are thereafter ground or otherwise conveniently diametrically reduced to slightly less than their original diameter, so that the wear resisting metal coating interconnecting the stacked rings is removed; leaving each ring with a groove filled with the wear resisting metal.

It is preferred that the wear resisting metal be applied by a spraying process rather than by a plating process since the former substantially increases the porosity and hence the oil retention properties of the deposited metal. However, the essence of the invention lies in the provision of a piston ring having a groove (or grooves) formed in the periphery thereof within which is bonded a highly porous wear resisting metal band having good oil retention characteristics and to a method for mass producing the same. Consequently, piston rings having these characteristics, including those rings formed by the method to be hereafter described, are within the purview of my invention.

It may also be found desirable to apply a hard metal coating to the side walls of the piston ring as well as to the cylinder wall engaging faces of the ring, where those side faces are subjected to substantial wear from the piston ring grooves within a piston. Still further, in some instances it may even be found desirable to use molybdenum and chromium or some other very hard metal in combination by filling the peripheral ring grooves with one metal and by coating the ring side faces with another metal. However, since the ring side faces are not subjected to sliding contact wear as are the cylinder wall engaging faces of the rings, it is not necessary that the hard metal coating applied to the side faces have particularly good oil retention characteristics. Consequently, it may be desirable, in some instances, to form a piston ring having a porous hard metal band of molybdenum or aluminum trioxide in the cylinder wall engaging face thereof and having a hard metal coating such as chromium on the side faces thereof.

It is therefore an important object of the present invention to provide a piston ring having a portion of the bearing surface thereof formed of porous wear resistant metal.

A further object of the invention resides in the provision of a piston ring having a portion of the bearing surface thereof formed of a porous wear resisting metal which has an unusually long life under relatively high load and high speed conditions and yet which may readily be seated on or mated with the cylinder wall which it contacts during use.

Another object of the invention is to provide a piston ring having a relatively soft metallic body such as cast iron or other ferrous metal and having at least a portion of the bearing surfaces thereof formed of a porous hard metal whereby the outstanding qualities of these metals are utilized to best advantage.

These and other objects of the invention will become apparent from time to time as the following specification proceeds and with reference to the accompanying drawings, wherein:

FIGURE 1 is a fragmental vertical sectional view through an ordinary flat-faced piston ring formed in accordance with the principles of the present invention;

FIGURE 2 is a fragmental vertical sectional view which is similar in nature to FIGURE 1 but which illustrates a multi-grooved molybdenum filled piston ring;

FIGURE 3 is a fragmental vertical sectional view through a piston and two associated piston rings showing the rings in contact with a portion of the cylinder wall and illustrating both tapered-face and torsional-twist piston rings formed in accordance with the present invention;

FIGURE 4 illustrates an arbor mounting arrangement for forming the piston rings;

Figure 5:
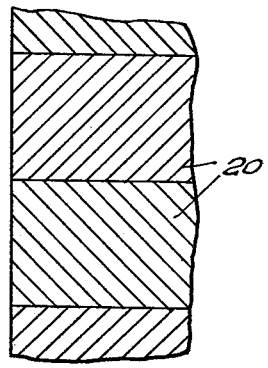
Figure 6:
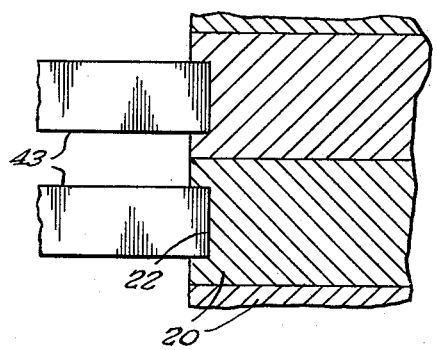
Figure 7:
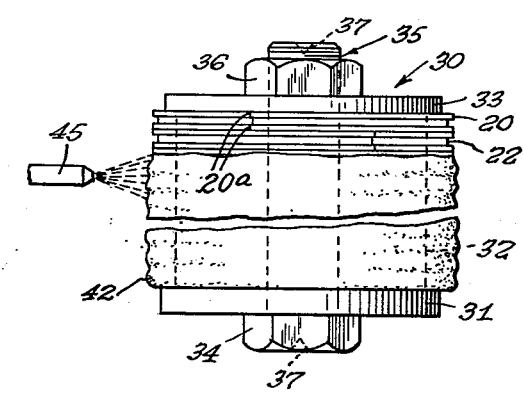
Figure 8:
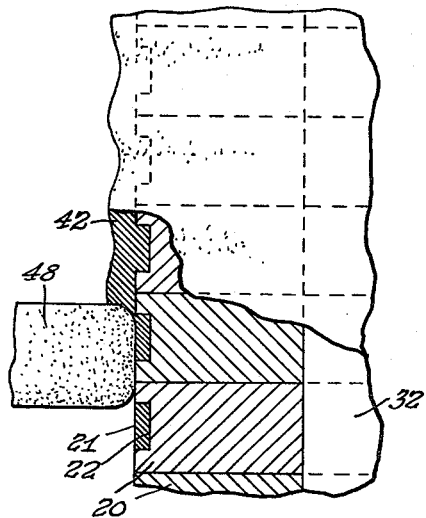

FIGURE 5 fragmentarily illustrates a plurality of piston rings prior to grooving;

FIGURE 6 illustrates the piston ring grooving operation;

FIGURE 7 illustrates another step in the formation of a piston ring constructed in accordance with the invention during which the hard metal coating is sprayed onto the cylinder contacting faces of the rings; and FIGURE 8 illustrates the grinding or finishing operation.

Referring initially to FIGURE 3, a piston head 10 has adjacent grooves 11 and 12 formed circumferentially therearound which receive tapered-face and torsional-twist rings 13 and 14 respectively. The rings are each shown as engaging a cylinder wall 15. The rings 13 and 14 likewise have circumferential grooves 16 and 17 formed therearound which have porous wear resisting metal bands 18 and 19, respectively, formed therein. The ring 14 has a relieved annular portion or bevel 14a on its inner periphery at its upper side to provide more ring body on the outer side of the radial medial plane of the ring. As shown in FIGURES 4 and 7, the rings are split at 20a and as indicated in FIGURE 3, when the ring 14 is contracted in the ring groove 12 by the cylinder wall 15, it will twist to provide an inclined outer periphery like the inclined outer periphery of the ring 13. These inclined outer peripheries have a narrow land of the body metal of the rings below the wear resisting metal bands 18 and 19. These narrow lands initially engage the cylinder wall 15 to provide "break-in" surfaces which quickly mate with the cylinder wall 15.

FIGURES 1 and 2 illustrate other embodiments of the invention; the standard flat-faced piston ring 20 of FIGURE 1 having a porous hard metal band 21 formed within a circumferential groove 22, and the piston ring 23 having a plurality of porous hard metal bands 24 formed within a plurality of circumferential grooves 25.

As viewed in FIGURE 3, rings formed in accordance with the present invention may be so mounted on their respective pistons that the ferrous metal portion of the rings will engage the cylinder wall during the early stages of their use and that the rings will therefore readily mate with these walls. When the ferrous metal portions of the rings have worn slightly, the porous hard metal band will constitute the ring bearing face and will effectively resist wear.

Various methods may, of course, be employed to produce piston rings of the type heretofore discussed but I have found that such rings may be very inexpensively mass produced with particularly good results by following the steps illustrated in FIGURES 4 through 8. A plurality of flat bearing faced piston rings of the type illustrated in FIGURE 1 may (prior to grooving) be disposed in stacked or racked relationship upon an arbor generally indicated by numeral 30 in FIGURE 4. The arbor comprises in general a collar 31 at the lower end thereof which is integral with a reduced diameter mandrel 32 and a cap 33 disposed at the upper end of the arbor and bearing against the piston rings 20. The head 34 of a bolt 35 provides a bottoming surface for the collar 31 and has a nut 36 threaded thereon at its opposite end which may be tightened down against the cap 33 to maintain the piston rings 20 firmly in proper position between the collar 31 and the cap 33. The rings may, in fact, be so tightly secured together that none of the after applied molybdenum spray will seep between the side faces of adjacent rings.

The bolt head 34 and the opposite end of the bolt are grooved as at 37 to facilitate mounting of the arbor 30 upon suitable drive means so that the arbor may be rotated during the formation of the piston rings.

After the rings have been arbor mounted with their cylinder wall engaging surfaces in a common surface of revolution, the rings are grooved. In the illustrated embodiment of the invention, the rings are circumferentially grooved, though it may be found desirable to form grooves extending through only a portion of the circumference of the rings. Many means may, of course, be employed to effect this grooving operation but a preferred method lies in the provision of tool bits mounted in a tool block which may be aligned with the several piston rings. As illustrated in FIGURE 6, the tool bits 43 are centrally positioned with respect to the top and bottom surfaces 38 and 39, respectively, of each piston ring 20 and have a width corresponding to the desired width of the grooves 22. Thus, by feeding in the tool block and simultaneously rotating the arbor 30, all of the arbor mounted piston rings 20 may be simultaneously circumferentially grooved.

The next step in my process is the application of wear resistant metal to the exposed surfaces of the piston rings 20. A spray gun 45 is preferably used for this purpose, and while many units are satisfactory, commercially available spraying equipment offered for sale by the Metalizing Engineering Company, Inc. of Long Island, New York, has provided satisfactory results in practice.

For purposes of explanation, but not by way of limitation, molybdenum is hereafter referred to as being used to coat the grooved rings and as constituting the hard metal ring bands.

Molybdenum is preferably supplied to the spray gun 45 in the form of wire, and a material having good characteristics is that identified as "Spray Bond Wire" by its manufacturer Metalizing Engineering Company, Inc. "Spray Bond Wire" is essentially pure molybdenum, and when heated to around 1400° F., the metal gives off a readily visible "smoke" which is the condensate of the common oxide of molybdenum ($MoO_3$). Although the metal melting point of molybdenum is 4750° F. its principal oxide is given off as a vapor at 1400° F. and apparently most of the oxide is in a vapor phase when the metal strikes the surface. This permits clean and uncombined metal to establish an intimate contact with the surface being sprayed. It would appear that as a result there is formed between the surface or base and the molybdenum metal an alloy of superior bonding characteristics.

The molybdenum coating may be applied by a stationarily mounted spray gun 45 while the arbor 30 is rotated at a desired rate of speed until the exposed surfaces of the arbor mounted rings have been coated with molybdenum to a desired thickness of approximately 0.007 of an inch or less. The applied molybdenum coating is indicated at 42 in FIGURES 7 and 8.

As hereinbefore noted, other materials such as aluminum trioxide may be substituted for molybdenum and applied with a spray gun to the exposed surfaces of the rings. For purposes of indicating the type of materials which might be used as substitutes for molybdenum, it is here noted that molybdenum has a hardness of approximately 360 as registered on the Vickers scale with a porosity, when sprayed, in the range of 10% to 16%.

Subsequent to the above-described steps illustrated in FIGURES 4, 5, 6 and 7, the rings may be finished by a single grinding operation. Referring to FIGURE 8, it will be noted that by traversing a grinding wheel 48 across the exposed surfaces of the arbor mounted piston rings 20, and by simultaneously rotating the arbor 30 the surplus solidified molybdenum will be removed from the rings to produce a finished ring of the type illustrated in FIGURE 1. It will be understood that the surfaces of the piston rings 20 are ground down to such as extent that the upper and lower faces 50 and 51, respectively, of the rings 20 have no molybdenum coating thereon. That is, the rings are diametrically reduced by grinding to less than their original diameter.

The result is a finished piston ring of the type illustrated in FIGURE 1 having top and bottom bearing faces 50 and 51 formed of the same material as the body of the piston ring (cast iron for instance) and having a circumferential band 21 of relatively hard, porous molybdenum. The surfaces of the band 21 and the bearing surfaces 50 and 51 are thus disposed in a common surface of revolution. These piston rings obviate the disadvantageous characteristics of prior types of chromium plated piston rings, and the like, since they are much less expensive to produce but are, nonetheless, characterized by superior resistance to abrasive and erosive wear and are further characterized by excellent oil carrying properties.

In order to prevent corrosion of the finished ring, manganese phosphate may be sprayed thereover. This protective coating will not adhere to the molybdenum but will prevent corrosion of the ring body. Such a procedure is not a necessary step in the formation of the ring, but may be desirable in instances in which the ring is to be stored for long periods of time.

Still further, while the piston ring which is formed in the foregoing manner has the advantageous characteristics of a molybdenum ring, the upper and lower bearing surfaces 50 and 51 of the ring may be formed of relatively soft cast iron so that the rings will readily mate with the cylinder walls.

As illustrated in FIGURE 1, the side or top and bottom faces 38 and 39 may also be coated as at 41, with molybdenum, aluminum trioxide, or chromium to prevent excessive wear to these portions of the rings; this coating being preferably applied subsequent to disassembly of the rings from the arbor. As noted above, however, it is not essential that the hard metal coating on the side faces have good oil retention characteristics. Thus, the side faces might be chromium plated. If chromium is used rather than molybdenum or aluminum trioxide, it will be plated on the top and bottom faces in a thickness of about 0.001 of an inch.

The other piston rings illustrated in FIGURES 2 and 3 may, of course, be formed in substantially the same manner; slight variances in the method of production being effected in accordance with the configuration of the various rings. That is, the multi-grooved ring illustrated in FIGURE 2 might require multiple grooving tools or multiple grooving operations. The tapered face rings could be grooved and sprayed as heretofore disclosed but might require multiple grinding wheels or multiple grinding operations for the finishing step.

It will be understood that the illustrated embodiments of the invention have been used for illustrative purposes only and that various modifications and variations of the present invention may be effected without departing from the spirit and scope of the novel concepts thereof.

I claim as my invention:

1. A piston ring comprising a split metal annulus body having top and bottom side walls for seating in a ring groove and an outer periphery for engaging a cylinder wall, said body being composed of ferrous metal, said outer periphery having a peripheral groove therearound, a metal band selected from the group consisting of molybdenum and aluminum trioxide secured in said groove, said outer periphery having a narrow land area adjacent said band composed of ferrous metal of the ring body and providing a quick break-in surface for the ring, and said band providing an oil retaining wear-resisting and temperature resisting bearing face for the ring body.

2. The piston ring of claim 1 wherein the metal band is composed of aluminum trioxide formed within said groove and intimately bonded with said ring body.

3. A contractible split torsion twist piston ring which comprises a split metal annulus body having an outer periphery for engaging a cylinder wall, top and bottom side walls for engaging the side walls of a ring groove and a relieved annular portion on the upper inner side of the radial medial plane of the ring providing more annulus body metal on the opposite side of said plane which is effective to provide for twisting the annulus body when the ring is contracted in a ring groove to thereby provide a conical outer periphery on the annulus body converging from the bottom side wall to the top side wall of the body, a groove in said outer periphery above said bottom side wall, a land area of the body metal at the base of the conical outer peripheral wall providing a break-in surface for quick mating with a cylinder wall, and a molybdenum band secured in said groove and having an outer peripheral surface providing a hard, high temperature resisting and wear resisting sealing surface for the body.

4. A piston ring comprising a split metal annulus body having top and bottom side walls for seating in a ring groove and an outer periphery for engaging the cylinder wall, said body being composed of ferrous metal, said outer periphery having a peripheral groove therearound, a porous molybdenum band in said groove intimately bonded to said body, said outer periphery having a narrow land area adjacent said molybdenum band composed of ferrous metal of the ring body and providing a quick break-in surface for the ring, and said band providing an oil retaining, wear resisting, and temperature resisting bearing face for the ring body.

5. The piston ring of claim 1 wherein the annulus body is contractible in a ring groove and has a sloping outer peripheral wall with the narrow land area at the base of the sloping outer peripheral wall alongside the metal band providing a break-in surface for quick mating with a cylinder wall before the band engages the cylinder wall.

References Cited in the file of this patent

UNITED STATES PATENTS

| | | |
|---|---|---|
| 2,119,035 | Ballard | May 31, 1938 |
| 2,380,654 | Lane et al. | July 31, 1945 |
| 2,488,697 | Ackerman | Nov. 22, 1949 |
| 2,761,749 | Marien | Sept. 4, 1956 |
| 2,905,512 | Anderson | Sept. 22, 1959 |
| 2,912,292 | Lawitschka | Nov. 10, 1959 |

FOREIGN PATENTS

| | | |
|---|---|---|
| 526,707 | Great Britain | Sept. 24, 1940 |